(12) United States Patent
Lee et al.

(10) Patent No.: US 12,523,032 B1
(45) Date of Patent: Jan. 13, 2026

(54) STORMWATER SYSTEM FOR MANAGING AND CONTROLLING SEDIMENT CAPTURE

(71) Applicant: Advanced Drainage Systems, Inc., Hilliard, OH (US)

(72) Inventors: Samuel Lee, Spring, TX (US); Gregory Spires, Powell, OH (US); Christopher Stoneburg, Westerville, OH (US); Joseph K Ludemann, Meriden, CT (US)

(73) Assignee: Advanced Drainage Systems, Inc., Hilliard, OH (US)

( * ) Notice: Subject to any disclaimer, the term of this patent is extended or adjusted under 35 U.S.C. 154(b) by 0 days.

(21) Appl. No.: 18/795,966

(22) Filed: Aug. 6, 2024

Related U.S. Application Data

(60) Provisional application No. 63/669,624, filed on Jul. 10, 2024.

(51) Int. Cl.
*E03F 5/14* (2006.01)
*E03F 1/00* (2006.01)

(52) U.S. Cl.
CPC .............. *E03F 5/14* (2013.01); *E03F 1/005* (2013.01)

(58) Field of Classification Search
CPC .................................. E03F 5/14; E03F 1/005
USPC .................................................... 210/170.03
See application file for complete search history.

(56) References Cited

U.S. PATENT DOCUMENTS

| | | | |
|---|---|---|---|
| 9,593,477 B1 * | 3/2017 | Stivers | C02F 3/327 |
| 11,028,569 B2 * | 6/2021 | Spires | E03F 5/14 |
| 2007/0267342 A1 * | 11/2007 | Cobb | E03F 5/14 |
| | | | 210/512.1 |

FOREIGN PATENT DOCUMENTS

| | | | | |
|---|---|---|---|---|
| DE | 102016115274 A1 * | 1/2018 | | E03F 1/005 |
| EP | 2371771 A1 * | 10/2011 | | C02F 3/327 |
| KR | 101271648 B1 * | 6/2013 | | E03F 5/101 |

OTHER PUBLICATIONS

Jalvo, Water Filtration Membranes Based on Non-Woven Cellulose Fabrics: Effect of Nanopolysaccharide Coatings on Selective Particle Rejection, Antifouling, and Antibacterial Properties, Nanomaterials (Year: 2021).*

\* cited by examiner

*Primary Examiner* — Ekandra S. Miller-Cruz
(74) *Attorney, Agent, or Firm* — FINNEGAN, HENDERSON, FARABOW, GARRETT & DUNNER L.L.P.

(57) ABSTRACT

Disclosed embodiments relate to a stormwater management system. In some embodiments, the stormwater management system may comprise a plurality of stormwater crates connected in one or more rows and a sediment capture row located within the plurality of stormwater crates. In some embodiments, the sediment capture row may comprise one or more stormwater crates connected in a row, a geotextile wrap surrounding the one or more stormwater crates, a plurality of side panels located on an outer side of the geotextile wrap, and a front panel connected to a front end of the sediment capture row.

17 Claims, 4 Drawing Sheets

STORMWATER SYSTEM FOR MANAGING AND CONTROLLING SEDIMENT CAPTURE

CROSS REFERENCE TO RELATED APPLICATION

This application claims the benefit of priority of U.S. Provisional Patent Application No. 63/669,624 filed on Jul. 10, 2024, the contents of which are incorporated herein by reference in their entirety.

TECHNICAL FIELD

This disclosure relates generally to systems, methods, and devices for fluid run-off management systems, and more particularly, to managing and controlling sediment capture using a plurality of connected stormwater crates that includes a row of crates designed to enhance sediment capture efficiency.

BACKGROUND

Fluid management systems may include systems designed to process rainwater or other fluid runoff, particularly stormwater. For example, fluid management systems may include below-ground systems such as underground storage chambers, structures, or modules, concrete drainage structures, thermoplastic storage chambers, or crate-type water management systems. These systems may be used to control water in areas that may experience overloads in the local drainage system during periods of high precipitation, such as around construction sites and developed urban areas. These systems may temporarily store and divert water runoff from impervious surfaces, such as sidewalks, roads, and parking lots. The system may then control the fluid discharge back to the environment to meter rainfall discharge from a site and reduce the risk of flooding. Fluid management systems may also be designed to receive and retain stormwater, allowing debris and contaminants to settle at the bottom of the chamber before the stormwater is released out of the system.

Crate-type water management systems may be used to form a chamber system suitable for managing stormwater runoff. For example, multiple stormwater management crates may be connected into a modular array of stormwater management crates, forming a stormwater management crate array. Stormwater management crate arrays may be placed underground, typically underneath parking lots or green spaces. These assemblies may be wrapped in a membrane to prohibit infiltration of surrounding soil or other aggregates into the stormwater management crate array, forming a void space within the assembly for the storage of stormwater runoff. These underground assemblies may accommodate a site's water volume runoff and treatment requirements and may also maximize the site's buildable area for other beneficial uses.

During a storm, stormwater or rainwater runoff may enter the underground stormwater management crate array, and in some configurations, may exit the assembly by flowing through a conduit connecting the assembly to another system component, such as a basin or another drainage structure. The stormwater management crate array may be placed on a prepared bed of coarse aggregate or stone, and may be backfilled underground with aggregate, earth, or other suitable backfill material. Stormwater may carry debris and solid contaminants, including dirt, sand, organic debris, paper, and plastic, that can pass into and through basins, traps, and filters of conventional stormwater management systems. Crate-type water management systems may be configured to receive stormwater and allow debris to settle to a bottom of the assembly before the stormwater is released into the ground or through an outlet or may be used to restrict the volume or discharge rate of stormwater runoff from leaving the site.

Existing stormwater management systems may prevent some debris and solid contaminants from reaching the crates. For example, some crate-type stormwater management systems are configured to divert surface stormwater to a solids retention system, and then into the array of chambers to minimize an amount of debris and solid contaminants that enter the crates connected to the system. Solids suspended or entrained in the stormwater may be retained by the solids retention system using a combination of settling and filtering actions. When stormwater inflow exceeds a capacity of the solids retention system, the water may rise above a weir to an overflow point at which water flows through a bypass line to the crate array.

However, solutions are needed to improve the isolation of debris and solid contaminants in stormwater management crate systems. Such solutions should provide a row within the stormwater management crate system configured to contain debris and solid contaminants on all sides to separate such contaminants from the array of stormwater management crates. Further solutions should reduce the labor and assembly costs by reducing the weight of the stormwater chamber array and allow for easier field assembly and installation of the sediment capture row within a stormwater management crate array. These solutions should also reduce the cost and effort and increase the efficiency of cleaning and maintaining the installed stormwater management crate system.

SUMMARY

The disclosed embodiments describe systems, methods, and devices for separating sediment and debris from fluid runoff and maintaining separation of the sediment and debris from fluid runoff. These systems, methods, and devices may include a stormwater management system. The stormwater management system may comprise a plurality of stormwater crates connected in one or more rows, and one or more sediment capture row located within the plurality of stormwater crates. A sediment capture row may be designed to separate sediment and debris from fluid runoff and to maintain separation of the sediment and debris from the fluid runoff. A sediment capture row may comprise one or more stormwater crates connected in a row, a geotextile wrap surrounding the one or more stormwater crates, a plurality of side panels located on an outer side of the geotextile wrap, and a front panel connected to a front end of the sediment capture row.

According to a disclosed embodiment, the sediment capture row may further comprise an opening through a top of one of the one or more stormwater crates configured to connect to a cleanout structure.

According to a disclosed embodiment, the front panel may comprise an opening configured to receive a flow of stormwater from an inlet.

According to a disclosed embodiment, the stormwater management system may further comprise an inlet structure configured to direct a flow of stormwater to the plurality of stormwater crates.

According to a disclosed embodiment, the inlet structure may comprise a weir configured to direct the flow of stormwater to the sediment capture row.

According to a disclosed embodiment, the sediment capture row may further comprise at least one stormwater cube.

According to a disclosed embodiment, a height of the at least one stormwater cube may be half a height of the one or more stormwater crates.

According to a disclosed embodiment, the sediment capture row may further comprise two stormwater cubes stacked vertically.

According to a disclosed embodiment, a top panel of the stormwater cube may comprise an opening configured to connect to a cleanout structure.

According to a disclosed embodiment, the geotextile wrap may comprise at least one of a woven geotextile fabric, a nonwoven geotextile fabric, a bituminous covering, or a synthetic polymer plastic sheeting.

According to a disclosed embodiment, the geotextile wrap may be configured to filter debris from a flow of stormwater through the sediment capture row.

According to a disclosed embodiment, the plurality of side panels may be configured to provide structural support to the sediment capture row.

According to a disclosed embodiment, the plurality of side panels may be configured to support the geotextile wrap.

According to a disclosed embodiment, the front panel may comprise a 6-oz nonwoven geotextile fabric.

According to a disclosed embodiment, an end of the sediment capture row opposite the front panel may comprise a 6-oz nonwoven geotextile fabric.

According to a disclosed embodiment, the end of the sediment capture row opposite the front panel may further comprise a side panel on an outer side of the 6-oz nonwoven geotextile fabric.

According to a disclosed embodiment, the plurality of stormwater management crates may be stacked vertically.

According to a disclosed embodiment, the geotextile wrap may surround the one or more stormwater crates of the sediment capture row around four sides.

According to a disclosed embodiment, a filtered flow of stormwater may exit from the sediment capture row to the plurality of stormwater management crates.

According to a disclosed embodiment, the plurality of stormwater management crates may be configured to disperse the filtered flow of stormwater into surrounding water permeable media.

BRIEF DESCRIPTION OF THE DRAWINGS

The accompanying drawings constitute a part of this specification. The drawings illustrate several embodiments of the present disclosure, and together with the description, serve to explain the principles of the disclosed embodiments.

DETAILED DESCRIPTION

Examples of embodiments of the present disclosure are described with reference to the accompanying drawings. In the figures, which are not necessarily drawn to scale, wherever convenient, the same reference numbers are used throughout the drawings to refer to the same or like parts. While examples and features of disclosed principles are described herein, modifications, adaptations, and other implementations are possible without departing from the spirit and scope of the disclosed embodiments. Also, the words "comprising," "having," "containing," and "including," and other similar forms are intended to be equivalent in meaning and be open ended in that an item or items following any one of these words is not meant to be an exhaustive listing of such item or items or meant to be limited to only the listed item or items. It should also be noted that as used in the present disclosure and in the appended claims, the singular forms "a," "an," and "the" include plural references unless the context clearly dictates otherwise.

The disclosed embodiments improve deficiencies in existing stormwater management crate systems. The disclosed embodiments provide a sediment capture row within the stormwater management crate system that may isolate contaminants from the array of stormwater management crates. The disclosed solutions further reduce labor and assembly costs by allowing for easy field assembly and installation of the sediment capture row within the stormwater management crate array.

Figure 1:
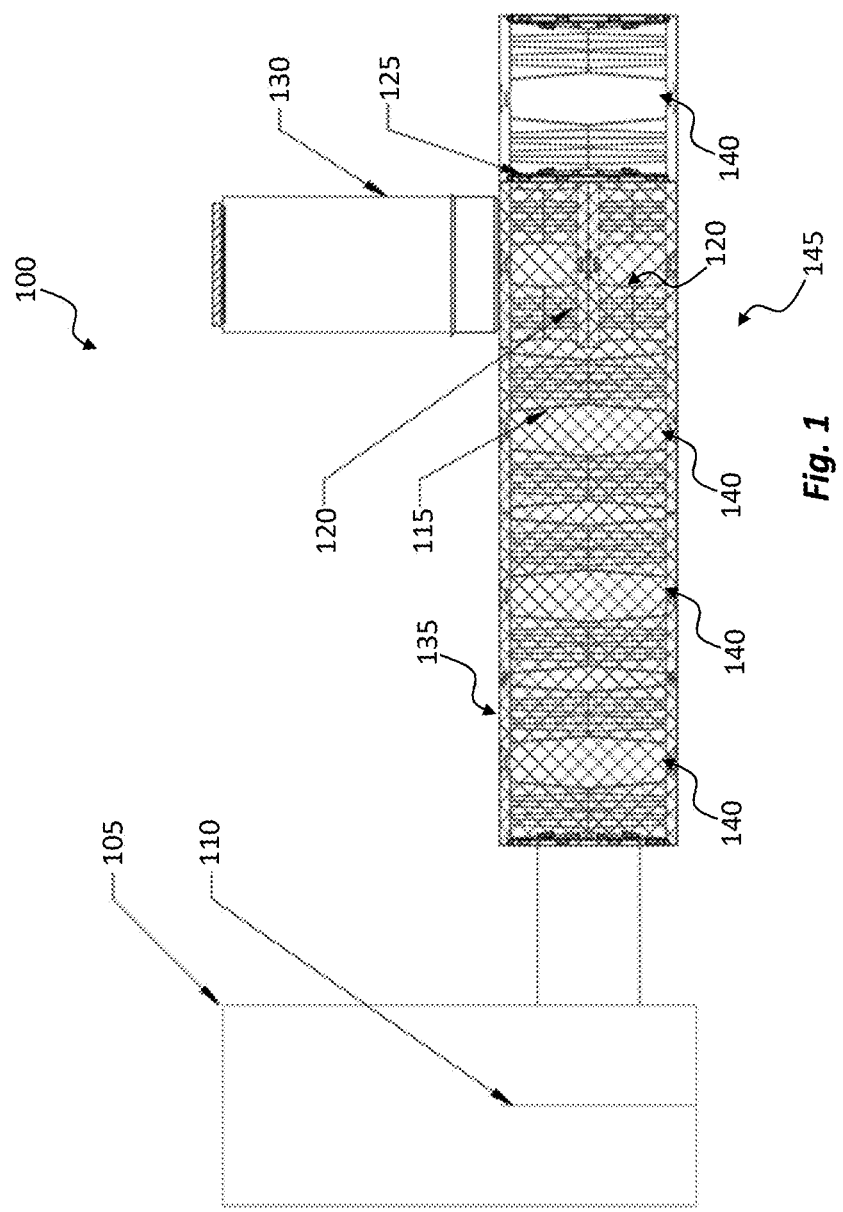
FIG. 1 depicts a sediment capture row installed within a stormwater crate array, with side panels removed for clarity, in accordance with disclosed embodiments.

FIG. 1 depicts a side view of stormwater management system 100, including sediment capture row 135. Stormwater management system 100 may include inlet structure 105. In some embodiments, inlet structure 105 may comprise one or more surface drains configured to direct a flow of runoff from a surface level to below-grade stormwater crate array 145. Inlet structure 105 may include weir 110 extending upwardly from a base of inlet structure 105. Weir 110 may direct the received runoff into a row of stormwater crates containing a sediment capture row, as disclosed herein.

Received stormwater runoff may flow into stormwater management system 100 through inlet structure 105 to stormwater crate array 145. Stormwater crate array 145 may comprise an array of interconnected stormwater crates 140 arranged side-by-side in rows. Stormwater crate array 145 may comprise any suitable number of stormwater crates 140 arranged in any number of rows. Each stormwater crate 140 may comprise a plurality of columns. Stormwater crates 140 of stormwater crate array 145 may be configured to receive and temporarily store rainwater and other fluids from one or more surface level drains. Over time, stormwater crates 140 may disperse the runoff stored therein by percolation into the surrounding water permeable media through the lattice structure of side panels.

Stormwater crate array 145 may include sediment capture row 135. Sediment capture row 135 may prevent sediment from depositing throughout stormwater crate array 145 by capturing and separating sediment from the flow of runoff received from inlet structure 105. Sediment capture row 135 may comprise a plurality of connected stormwater crates 140 arranged in a row. Although FIG. 1 depicts sediment capture row 135 comprising three stormwater crates 140, sediment capture row 135 may comprise any number of stormwater crates 140. Sediment capture row 135 may further include stormwater cubes 120 at an end of sediment capture row 135. Stormwater cube 120 may comprise a plurality of columns. When assembled, a height of stormwater cube 120 may be approximately half a height of stormwater crate 140. Sediment capture row 135 may comprise two stormwater cubes 120, with a first stormwater cube 120 stacked above a second stormwater cube 120. Stormwater cubes 120 may create an inspection point for inspection and maintenance of sediment capture row 135. For example, cleanout structure 130 may comprise a manhole, and may extend from ground-level downward to an opening in a top plate of stormwater cubes 120. Cleanout structure 130 may be used to access sediment capture row 135 through stormwater cubes 120 for inspection, maintenance, and sediment removal.

Figure 2:
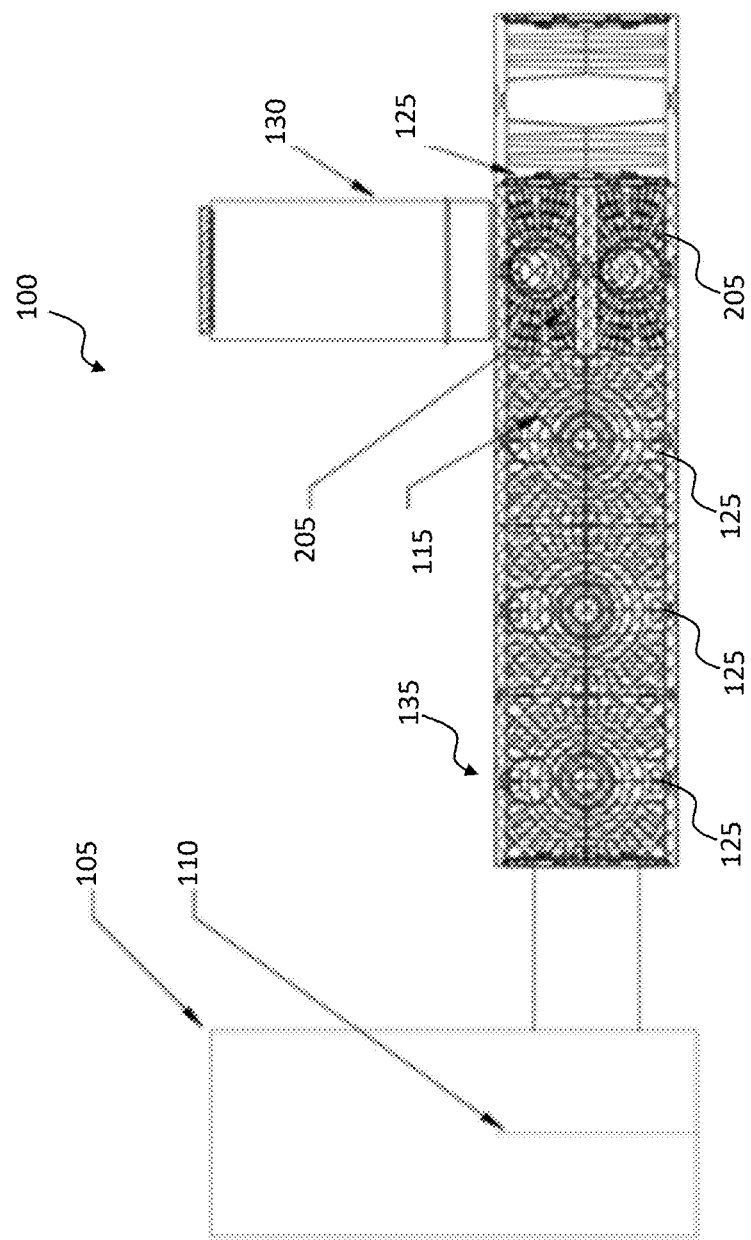
FIG. 2 depicts a sediment capture row, including side panels, installed within a stormwater crate array, in accordance with disclosed embodiments.

Sediment capture row 135 may be wrapped in geotextile wrap 115. Geotextile wrap 115 may comprise a woven or nonwoven geotextile fabric, bituminous covering, synthetic polymer plastic sheeting, or other suitable geotextile fabric configured to wrap the perimeter of sediment capture row 135. Geotextile wrap 115 may filter and separate debris and sediment from the flow of stormwater runoff through sediment capture row 135, which may prevent such debris and sediment from entering other stormwater crates 140 in stormwater crate array 145. As depicted in FIG. 1 and FIG. 2, sediment capture row 135 may further include side panels 125 installed around geotextile wrap 115 to support geotextile wrap 115. Side panels 125 may further provide structural support and stability to sediment capture row 135. Stormwater cubes 120 may include half side panels 205. A height of half side panel 205 may be approximately half the height of side panel 125. The height of half side panel 205 may correspond to a height of stormwater cubes 120. Side panels 125 and half side panels 205 may be installed around a perimeter of sediment capture row 135, as depicted in FIG. 2 to support geotextile wrap 115 installed around stormwater crates 140 and stormwater cubes 120. Geotextile wrap 115, side panels 125, and half side panels 205 may separate debris and sediment within sediment capture row 135 to prevent such debris and sediment from entering other stormwater crates 140 within stormwater crate array 145. The debris and sediment may settle out of the flow of stormwater runoff within sediment capture row 135 and may be periodically cleaned and removed from sediment capture row 135 through use of cleanout structure 130.

Figure 3:
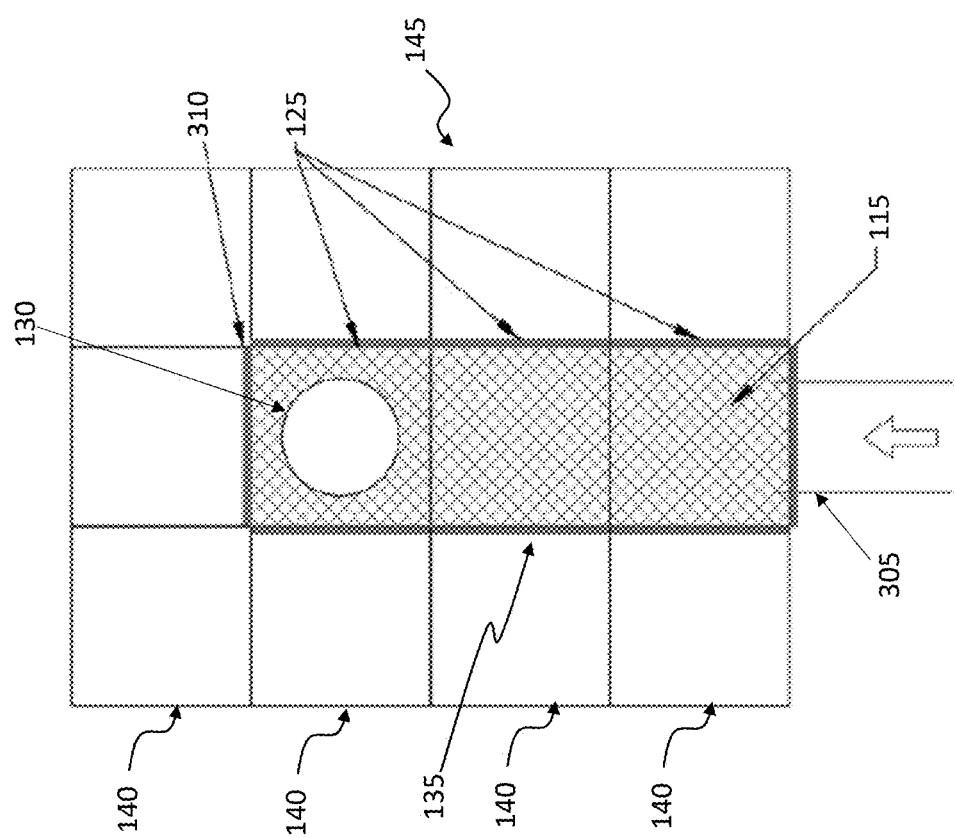
FIG. 3 depicts a top view of a stormwater crate array with a sediment capture row, in accordance with disclosed embodiments.

FIG. 3 depicts a top view of stormwater crate array 145. As depicted in FIG. 3, stormwater crate array 145 may comprise stormwater crates 140 arranged side-by-side in rows. Although FIG. 3 depicts stormwater crate array 145 with three rows of four stormwater crates 140, stormwater crate array 145 may comprise any suitable number of stormwater crates 140 in any number of rows. Stormwater runoff may flow from inlet 305, which may be connected to a surface-level drain, to sediment capture row 135. As depicted in FIG. 3, sediment capture row 135 may comprise three stormwater crates 140 connected in a row. In other embodiments, sediment capture row 135 may comprise more or fewer stormwater crates 140. Stormwater crates 140 of sediment capture row 135 may be wrapped in geotextile wrap 115. Geotextile wrap 115 may facilitate isolation of contaminants within sediment capture row 135 to prevent such contaminants from entering other stormwater crates 140 within stormwater crate array 145. Sediment capture row 135 may further include side panels 125 installed around a perimeter of sediment capture row 135. Side panels 125 may be installed on an outside of geotextile wrap 115 to support geotextile wrap 115 and prevent geotextile wrap 115 from falling or dropping from around stormwater crates 140. In some embodiments, an end 310 of sediment capture row 135 may comprise a 6-oz nonwoven geotextile fabric. A side panel, such as side panel 125 may be installed around the nonwoven geotextile fabric at end 310 of sediment capture row 135 to support the nonwoven geotextile fabric during operation of sediment capture row 135. Cleanout structure 130 may be connected to an end of sediment capture row 135. Cleanout structure 130 may allow access to sediment capture row 135 for inspection, maintenance, and removal of sediment and debris. Sediment and debris may settle out of the flow of stormwater within sediment capture row 135 and the filtered stormwater may then flow through geotextile wrap 115 and side panels 125 to the remaining stormwater crates 140 of stormwater crate array 145.

Figure 4:
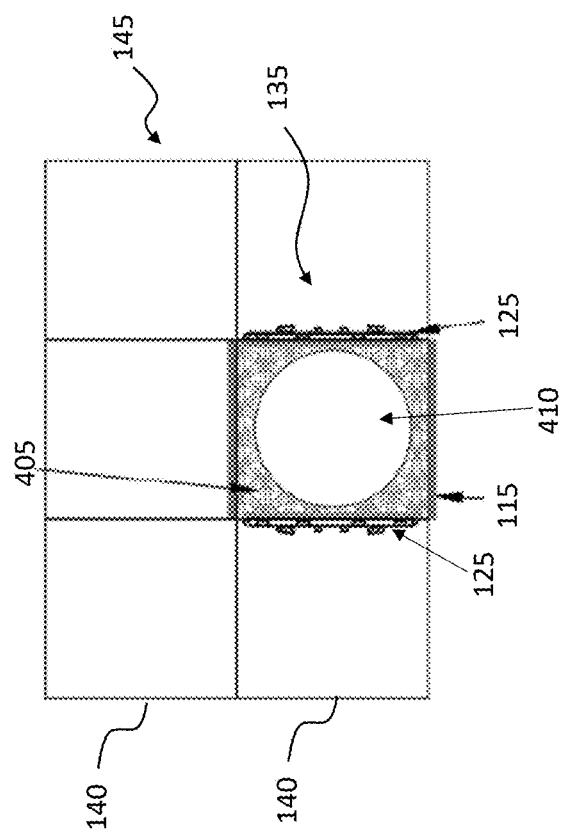
FIG. 4 depicts a front view of a stormwater crate array with a sediment capture row, in accordance with disclosed embodiments.

FIG. 4 depicts a front view of stormwater crate array 145. As depicted in FIG. 4, two rows of stormwater crates 140 may be stacked vertically. In other embodiments, stormwater crates 140 may not be stacked vertically, or more rows of stormwater crates 140 may be stacked vertically. Sediment capture row 135 in stormwater crate array 145 may include opening 410 in front panel 405. Opening 410 may connect to an inlet, such as inlet 305 as depicted in FIG. 3, to allow stormwater runoff to flow into sediment capture row 135. In some embodiments, front panel 405 may comprise a 6-oz nonwoven geotextile fabric. As depicted in FIG. 4, sediment capture row 135 may be wrapped around four sides with geotextile wrap 115, which may filter stormwater runoff and separate sediment and debris within sediment capture row 135. Side panels 125 may be installed on opposite sides of sediment capture row 135 to support geotextile wrap 115 during operation of a stormwater crate array including sediment capture row 135.

The foregoing description has been presented for purposes of illustration. It is not exhaustive and is not limited to precise forms or embodiments disclosed. Modifications and adaptations of the embodiments will be apparent from consideration of the specification and practice of the disclosed embodiments. For example, while certain components have been described as being coupled to one another, such components may be integrated with one another or distributed in any suitable fashion.

Moreover, while illustrative embodiments have been described herein, the scope includes any and all embodiments having equivalent elements, modifications, omissions, combinations (e.g., of aspects across various embodiments), adaptations and/or alterations based on the present disclosure. The elements in the claims are to be interpreted broadly based on the language employed in the claims and not limited to examples described in the present specification or during the prosecution of the application, which examples are to be construed as nonexclusive. Further, the steps of the disclosed methods can be modified in any manner, including reordering steps and/or inserting or deleting steps.

The features and advantages of the disclosure are apparent from the detailed specification, and thus, it is intended that the appended claims cover all systems and methods falling within the true spirit and scope of the disclosure. As used herein, the indefinite articles "a" and "an" mean "one or more." Similarly, the use of a plural term does not necessarily denote a plurality unless it is unambiguous in the given context. Words such as "and" or "or" mean "and/or" unless specifically directed otherwise. Further, since numerous modifications and variations will readily occur from studying the present disclosure, it is not desired to limit the disclosure to the exact construction and operation illustrated and described, and, accordingly, all suitable modifications and equivalents may be resorted to, falling within the scope of the disclosure.

Other embodiments will be apparent from consideration of the specification and practice of the embodiments disclosed herein. It is intended that the specification and examples be considered as example only, with a true scope and spirit of the disclosed embodiments being indicated by the following claims.

What is claimed is:

1. A stormwater management system, comprising:
a plurality of stormwater crates connected in one or more rows; and
a sediment capture row located within the plurality of stormwater crates,
the sediment capture row comprising:
one or more stormwater crates connected in a row;
a geotextile wrap surrounding four sides of the one or more stormwater crates forming the sediment capture row;
a plurality of side panels installed around a perimeter of the one or more stormwater crates forming the sediment capture row and located on an outer side of the geotextile wrap;
a front panel connected to a front end of the sediment capture row;
wherein the front panel comprises an opening configured to receive a flow of stormwater from an inlet
one or more stormwater cubes disposed at an end of the sediment capture row, the one or more stormwater cubes comprising a plurality of columns; and
a cleanout structure comprising a manhole, and wherein the sediment capture row further comprises an opening through a top of one of the one or more stormwater crates configured to connect to the cleanout structure, wherein the cleanout structure extends from a ground-level downward to the opening when the stormwater management system is underground.

2. The stormwater management system of claim 1, further comprising an inlet structure configured to direct a flow of stormwater to the plurality of stormwater crates.

3. The stormwater management system of claim 2, wherein the inlet structure comprises a weir configured to direct the flow of stormwater to the sediment capture row.

4. The stormwater management system of claim 1, wherein a height of the one or more stormwater cubes is half a height of the one or more stormwater crates.

5. The stormwater management system of claim 4, wherein the sediment capture row further comprises two stormwater cubes stacked vertically.

6. The stormwater management system of claim 1, wherein the geotextile wrap comprises at least one of a woven geotextile fabric, a nonwoven geotextile fabric, a bituminous covering, or a synthetic polymer plastic sheeting.

7. The stormwater management system of claim 1, wherein the geotextile wrap is configured to filter debris from a flow of stormwater through the sediment capture row.

8. The stormwater management system of claim 1, wherein the plurality of side panels are configured to provide structural support to the sediment capture row.

9. The stormwater management system of claim 1, wherein the plurality of side panels are configured to support the geotextile wrap.

10. The stormwater management system of claim 1, wherein the front panel further comprises a 6-oz nonwoven geotextile fabric at the front end of the sediment capture row.

11. The stormwater management system of claim 1, wherein an end of the sediment capture row opposite the front end comprises a 6-oz nonwoven geotextile fabric.

12. The stormwater management system of claim 11, wherein the end of the sediment capture row opposite the front end further comprises a side panel of the plurality of side panels on an outer side of the 6-oz nonwoven geotextile fabric.

13. The stormwater management system of claim 1, wherein the plurality of stormwater management crates are stacked vertically.

14. The stormwater management system of claim 1, wherein the geotextile wrap surrounds the one or more stormwater crates of the sediment capture row around four sides.

15. The stormwater management system of claim 1, wherein a filtered flow of stormwater exits from the sediment capture row to the plurality of stormwater management crates.

16. The stormwater management system of claim 14, further comprising:
water permeable media surrounding the plurality of stormwater management crates; and
wherein the plurality of stormwater management crates are configured to disperse the filtered flow of stormwater into the surrounding water permeable media.

17. The stormwater management system of claim 1, wherein the one or more stormwater cubes are disposed at an end of the sediment capture row opposite the front end.

* * * * *